(12) United States Patent
Kaplan et al.

(10) Patent No.: US 10,419,419 B2
(45) Date of Patent: Sep. 17, 2019

(54) TECHNOLOGIES FOR SENSOR ACTION VERIFICATION

(71) Applicant: Intel Corporation, Santa Clara, CA (US)

(72) Inventors: David Kaplan, Modi'in (IL); Shahar Taite, Kfar Saba (IL); Aviv Ron, Nir Moshe (IL); Tomer Rider, Naahryia (IL)

(73) Assignee: Intel Corporation, Santa Clara, CA (US)

( * ) Notice: Subject to any disclaimer, the term of this patent is extended or adjusted under 35 U.S.C. 154(b) by 88 days.

(21) Appl. No.: 14/495,059

(22) Filed: Sep. 24, 2014

(65) Prior Publication Data

US 2016/0087976 A1 Mar. 24, 2016

(51) Int. Cl.
*H04L 29/06* (2006.01)
*H04W 12/08* (2009.01)

(52) U.S. Cl.
CPC ........ *H04L 63/0823* (2013.01); *H04L 63/126* (2013.01); *H04W 12/08* (2013.01)

(58) Field of Classification Search
CPC .............. H04L 63/0442; H04L 63/062; H04L 63/0853
See application file for complete search history.

(56) References Cited

U.S. PATENT DOCUMENTS

| 7,903,147 | B2 | 3/2011 | Lee |
| 8,424,062 | B2 * | 4/2013 | Sanchez ............... H04L 63/064 455/406 |
| 8,775,808 | B2 | 7/2014 | Ali |
| 8,800,003 | B2 * | 8/2014 | Guo .................... H04L 63/0823 726/4 |

(Continued)

FOREIGN PATENT DOCUMENTS

| JP | 2002-027554 | 1/2002 |
| JP | 2002-135838 | 5/2002 |
| KR | 10-2000-0031051 | 6/2000 |

OTHER PUBLICATIONS

"Sensor Hub," http://en.wikipedia.org/wiki/Sensor_hub, printed Oct. 31, 2014, 2 pages.

(Continued)

*Primary Examiner* — Lynn D Feild
*Assistant Examiner* — Vadim Savenkov
(74) *Attorney, Agent, or Firm* — Barnes & Thornburg LLP

(57) ABSTRACT

Technologies for sensor action verification include a local computing device to receive a request for the local computing device to perform a sensor action from a remote computing device. The local computing device verifies the received request to confirm that the remote computing device is authorized to request the local computing device to perform the sensor action and performs, by a sensor controller of the local computing device, the requested sensor action in response to verification of the received request. The sensor controller manages operation of one or more sensors of the local computing device. The local computing device transmits a response message to the remote computing device indicating whether the requested sensor action has been performed by the sensor controller of the local computing device.

24 Claims, 6 Drawing Sheets

(56) References Cited

U.S. PATENT DOCUMENTS

| | | | | |
|---|---|---|---|---|
| 8,955,039 B2* | 2/2015 | Prakash | ............... | G06F 21/6218 713/168 |
| 9,077,716 B2* | 7/2015 | Myers | ................ | G07C 9/00103 |
| 2002/0196912 A1* | 12/2002 | Norris | ............... | H04L 29/06027 379/88.17 |
| 2003/0014521 A1* | 1/2003 | Elson | .................... | G06F 9/5011 709/225 |
| 2008/0161020 A1* | 7/2008 | Malon | ................. | G06Q 10/109 455/456.6 |
| 2008/0214211 A1* | 9/2008 | Lipovski | ........... | H04M 1/72577 455/456.4 |
| 2008/0280591 A1* | 11/2008 | Opaluch | ................ | H04M 11/04 455/410 |
| 2009/0320143 A1* | 12/2009 | Gear | ....................... | G06F 9/468 726/29 |
| 2010/0042835 A1 | 2/2010 | Lee et al. | | |
| 2010/0125605 A1* | 5/2010 | Nair | .................. | G06F 17/30867 707/784 |
| 2013/0033379 A1* | 2/2013 | Jentoft | ................... | H04N 7/185 340/541 |
| 2013/0222609 A1* | 8/2013 | Soffer | .................. | G03B 11/043 348/207.1 |
| 2014/0053283 A1* | 2/2014 | Odom | .................... | G06F 21/10 726/30 |
| 2014/0075496 A1* | 3/2014 | Prakash | .............. | G06F 21/6218 726/1 |
| 2014/0378098 A1* | 12/2014 | Trocke | .................. | H04W 12/08 455/411 |
| 2015/0081568 A1* | 3/2015 | Land, III | ............... | G06Q 30/00 705/304 |
| 2015/0317230 A1* | 11/2015 | Le Grand | ............. | G01D 9/005 702/187 |
| 2016/0004575 A1* | 1/2016 | Fink | ......................... | G06F 9/54 719/328 |

OTHER PUBLICATIONS

International Search Report for PCT/US15/046541, dated Feb. 19, 2016 (3 pages).

Written Opinion for PCT/US15/046541, dated Feb. 19, 2016 (7 pages).

First Office action in Chinese patent application No. 201580045161.5, dated Feb. 19, 2019, including machine translation (17 pages).

Extended European search report for European patent application No. 15843823.4, dated Apr. 16, 2018 (11 pages).

* cited by examiner

TECHNOLOGIES FOR SENSOR ACTION VERIFICATION

BACKGROUND

Smartphones, wearable computing devices (e.g., glasses, watches, health fitness monitors, etc.), and other mobile computing devices are commonly carried by people at all times. Each of those mobile computing devices generally includes multiple sensors depending on the intended use of the particular mobile computing device. For example, a mobile computing device may include one or more sensors such as cameras, microphones, location sensors, inertial sensors, and/or other sensors.

Such sensors potentially pose a significant security and privacy risk to others in the vicinity of the computing device. For example, an employer may not want employees to be able to record confidential conversations at the workplace (e.g., in the defense industry). Common solutions to ensure privacy is maintained include confiscation of the computing devices of everyone involved in a confidential conference. Alternatively, software-based solutions may allow one device to request another device to disable sensors; however, such software-based solutions are oftentimes easily compromised.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
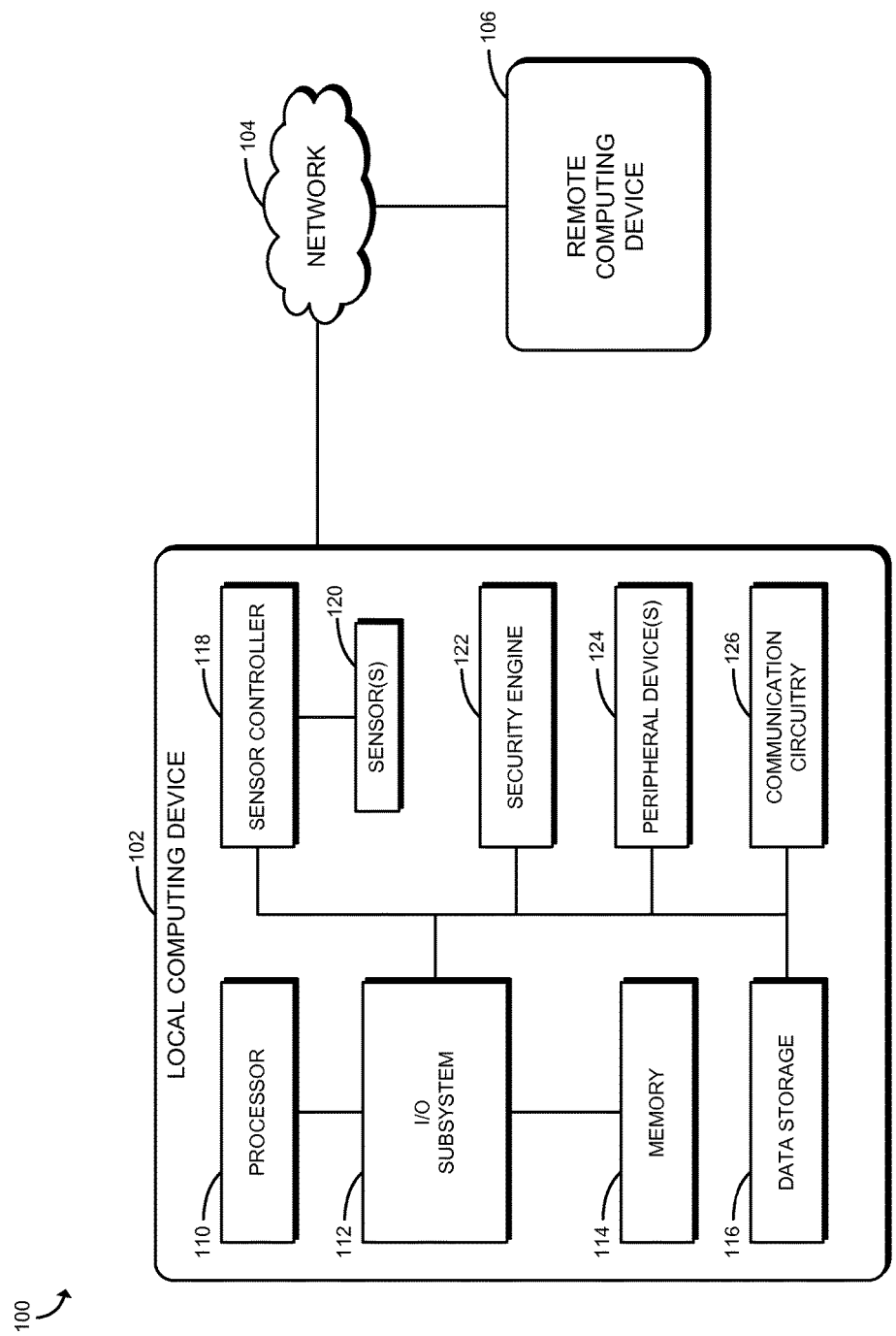
FIG. 1 is a simplified block diagram of at least one embodiment of a system for sensor action verification.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system for sensor action verification includes a local computing device 102, a network 104, and a remote computing device 106. As described in detail below, in use, the local computing device 102 may establish trusted relationships with one or more remote computing devices 106 and determine which sensor actions, if any, the remote computing devices 106 may request the local computing device 102 to perform. The local computing device 102 may receive a request from a remote computing device 106 to perform a particular sensor action on the local computing device 102. The local computing device 102 verifies the request to confirm that the remote computing device 106 is authorized to request that sensor action to be performed and, if so, performs the requested sensor action. The local computing device 102 may also transmit a response message to the remote computing device 106 indicating whether the requested sensor action was performed and/or other relevant information.

The local computing device 102 may be embodied as any type of computing device capable of performing the functions described herein. For example, the local computing device 102 may be embodied as a desktop computer, server, router, switch, laptop computer, tablet computer, notebook, netbook, Ultrabook™, cellular phone, smartphone, wearable computing device, personal digital assistant, mobile Internet device, Hybrid device, and/or any other computing/communication device. As shown in FIG. 1, the illustrative local computing device 102 includes a processor 110, an input/output ("I/O") subsystem 112, a memory 114, a data storage 116, a sensor controller 118, one or more sensors 120, a security engine 122, one or more peripheral devices 124, and a communication circuitry 126. Of course, the local computing device 102 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the local computing device 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the local computing device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the local computing device 102, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. The data storage 116 and/or the memory 114 may store various data useful in the operation of the local computing device 102 as discussed below.

The sensor controller 118 may be embodied as a processor, controller (e.g., a microcontroller), collection of devices, and/or other circuitry for controlling, managing, processing, and/or otherwise handling the sensors 120 and the sensor data generated therefrom. In some embodiments, the sensor controller 118 is embodied as an integrated sensor hub such that the sensor controller 118 is, for example, integrated within the same silicon chip as the processor 110 of the local computing device 102. In other embodiments, the sensor controller 118 may be embodied as a separate device independent of the processor 110. It should be appreciated that, in the illustrative embodiment, the sensor controller 118 may communicate with the sensors 120 in an out-of-band manner from the processor 110 such that the processor 110 cannot directly control the sensors 120 and/or access the sensor data. As such, the sensor controller 118 may operate its own operating system independent of the processor 110 and may include an application programming interface (API) or other interface that permits communication between the sensor controller 118 and the processor 110 (e.g., through the I/O subsystem 112).

The sensor controller 118 analyzes and/or processes data collected from the one or more sensors 120 of the local computing device 102. The sensors 120 collect sensor data associated with the local computing device 102 (e.g., its context, environment, and/or other characteristics). Each of the sensors 120 may be embodied as any type of sensor or sensor circuitry to detect, capture, measure, or sense any suitable aspect of the local environment of the local computing device 102. In various embodiments, the sensors 120 may be embodied as, or otherwise include, for example, inertial sensors, proximity sensors, optical sensors, light sensors, audio sensors, temperature sensors, motion sensors, piezoelectric sensors, pressure sensors, and/or other types of sensors that generate data useful to the local computing device 102 and/or other computing devices (e.g., the remote computing device 106). For example, in some embodiments, the sensors 120 may include a camera, a microphone, and/or a location sensor (e.g., a global positioning system (GPS) sensor). Of course, the local computing device 102 may also include components and/or devices configured to facilitate the use of the sensors 120.

In the illustrative embodiment, the sensor controller 118 handles the operation of the sensors 120. For example, the sensor controller 118 may control whether each of the sensors 120 is active (e.g., on) or inactive (e.g., off) at a particular point in time. Additionally or alternatively, in some embodiments, the sensor controller 118 controls or dictates which functions each of the sensors 120 may perform while active. For example, in some embodiments, the sensor controller 118 may determine that an inertial sensor may measure pitch but not measure roll or yaw at a particular point in time or while/until some other condition is satisfied.

The security engine 122 may be embodied as any hardware component(s) or circuitry capable of performing cryptographic functions, security functions, and/or establishing a trusted execution environment. For example, in some embodiments, the security engine 122 may be embodied as a security co-processor, a trusted platform module (TPM), a manageability engine (ME), or an out-of-band processor. Additionally, in some embodiments, the security engine 122 may establish an out-of-band communication link with remote devices (e.g., the remote computing device 106). It should be appreciated that the security engine 122 may be incorporated in, or otherwise form a portion of, the sensor controller 118 or another device/component of the local computing device 102 in some embodiments.

The peripheral devices 124 may include any number of additional peripheral or interface devices, such as speakers, microphones, additional storage devices, and so forth. The particular devices included in the peripheral devices 124 may depend on, for example, the type and/or intended use of the local computing device 102. It should be appreciated that, in some embodiments, one or more of the peripheral devices 124 may be controlled, monitored, or otherwise managed (e.g., by the sensor controller 118) similar to the sensors 120. For example, in some embodiments, the sensor controller 118 (or another device/component of the local computing device 102) may control which functions a particular peripheral device 124 may perform and/or when the peripheral device 124 may be active. As described below, in an embodiment, a user of the remote computing device 106 may request the local computing device 102 to shut off (i.e., stop collecting data with) all audiovisual sensors 120 and/or peripheral devices 124 in order to permit a secure and confidential discourse between the users of the computing devices 102, 106.

The communication circuitry 126 of the local computing device 102 may be embodied as any communication circuitry, device, or collection thereof, capable of enabling communications between the local computing device 102 and other remote devices (e.g., the remote computing device 106). The communication circuitry 126 may be configured to use any one or more communication technologies (e.g., wireless or wired communications) and associated protocols (e.g., Ethernet, Bluetooth®, Wi-Fi®, WiMAX, etc.) to effect such communication.

The network 104 may be embodied as any type of communication network capable of facilitating communication between the local computing device 102 and remote devices (e.g., the remote computing device 106). As such, the network 104 may include one or more networks, routers, switches, computers, and/or other intervening devices. For example, the network 104 may be embodied as or otherwise include one or more cellular networks, telephone networks, local or wide area networks, publicly available global networks (e.g., the Internet), an ad hoc network, or any combination thereof. In some embodiments, the local computing device 102 and the remote computing device 106 may establish a communication link with one another and communicate via Bluetooth®, Near Field Communication (NFC), and/or using other near-range communication technologies and protocols. As such, although the remote computing device 106 is described herein as being remote to the local computing device 102, it should be appreciated that the local computing device 102 and the remote computing device 106 may be in close proximity to one another (i.e., local to one another) in some embodiments. For example, as discussed herein, in some embodiments, the local computing device 102 and the remote computing device 106 may be located in the same room (e.g., a private conference room).

The remote computing device 106 may be embodied as any type of computing device capable of performing the functions described herein. For example, in some embodiments, the remote computing device 106 may be similar to the local computing device 102 described above. For example, the remote computing device 106 may be embodied as a desktop computer, server, router, switch, laptop computer, tablet computer, notebook, netbook, Ultrabook™, cellular phone, smartphone, wearable computing device, personal digital assistant, mobile Internet device, Hybrid device, and/or any other computing/communication device. Further, the remote computing device 106 may include components similar to those of the local computing device 102 discussed above. The description of those components of the local computing device 102 is equally applicable to the description of components of the remote computing device 106 and is not repeated herein for clarity of the description. Further, it should be appreciated that the remote computing device 106 may include other components, subcomponents, and devices commonly found in a computing device, which are not discussed above in reference to the local computing device 102 and not discussed herein for clarity of the description. Additionally, in some embodiments, one or more of the components of the local computing device 102 may be omitted from the remote computing device 106 (e.g., sensors 120 and/or the sensor controller 118).

Although only one local computing device 102, one network 104, and one remote computing device 106 are shown in the illustrative embodiment of FIG. 1, the system 100 may include multiple local computing devices 102, networks 104, and/or remote computing devices 106 in other embodiments. For example, the remote computing device 106 may communicate with multiple local computing devices 102 to request those devices 102 to perform a particular sensor action (e.g., disable a particular sensor 120). Additionally, it should be appreciated that the functions described as occurring on the local computing device 102 and the remote computing device 106 may be reversed in some embodiments. For example, in some embodiments, the local computing device 102 may request one or more remote computing devices 106 to perform a particular sensor action.

Figure 2:
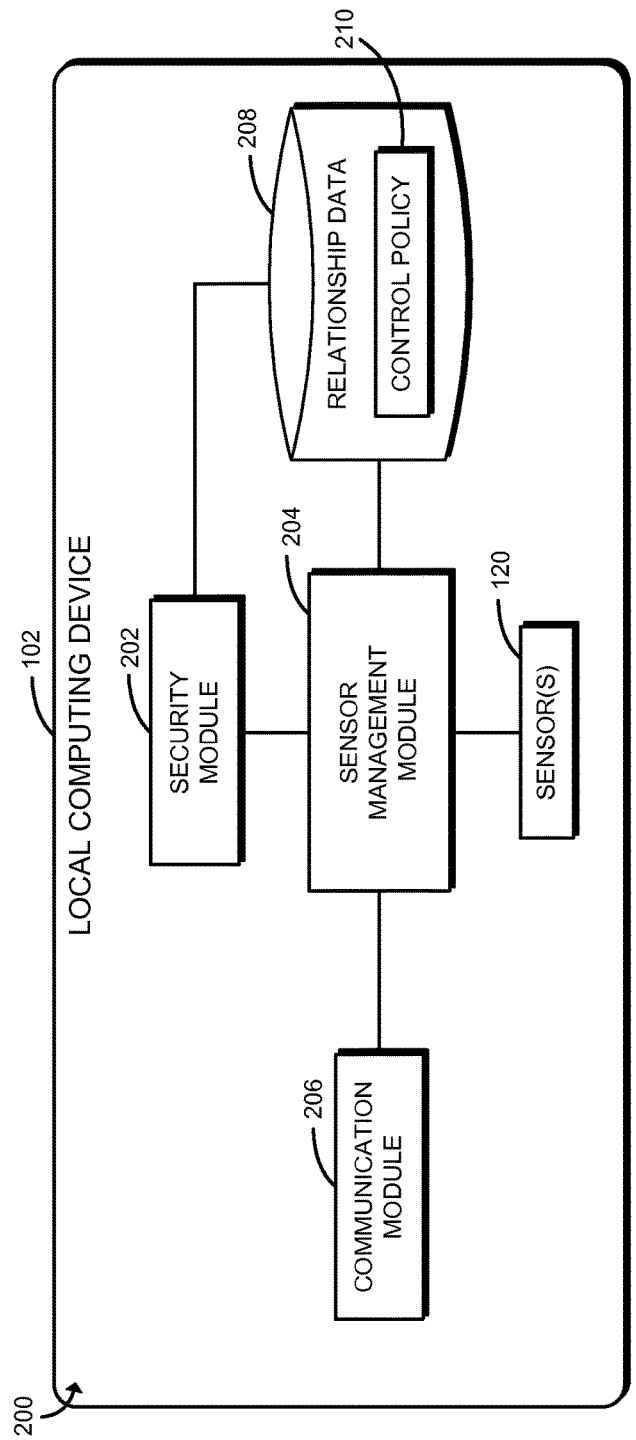
FIG. 2 is a simplified block diagram of at least one embodiment of an environment of the local computing device of the system of FIG. 1.

Referring now to FIG. 2, in use, the local computing device 102 establishes an environment 200 for sensor action verification. The illustrative environment 200 of the local computing device 102 includes a security module 202, a sensor management module 204, and a communication module 206. Each of the modules of the environment 200 may be embodied as hardware, software, firmware, or a combination thereof. Additionally, in some embodiments, one or more of the illustrative modules may form a portion of another module and/or one or more of the illustrative modules may be embodied as a standalone or independent module. For example, each of the modules, logic, and other components of the environment 200 may form a portion of, or otherwise be established by, the processor 110 of the local computing device 102.

The security module 202 may establish a trusted relationship with one or more remote computing devices 106 and determine whether a remote computing device 106 is authorized to request the local computing device 102 to perform a particular sensor action (e.g., disable a sensor 120) based on the established trusted relationship. In the illustrative embodiment, if the remote computing device 106 requesting the particular sensor action to be performed by the local computing device 102 has not established a trusted relationship with the local computing device 102 and/or is not authorized to request that particular action to be performed, the local computing device 102 rejects or ignores the request (i.e., the local computing device 102 does not perform the requested sensor action).

As discussed herein, the sensor action may be embodied as any action associated with one or more of the sensors 120 of the local computing device 102. In some embodiments, the sensor action may be associated with controlling whether a particular sensor 120 is enabled or disabled, whereas in other embodiments the sensor action is associated with modifying a more specific functionality of the sensor 120. For example, a particular sensor 120 may include multiple control parameters, and the sensor action may be to modify one or more of those control parameters. For example, in an embodiment involving a camera, the control parameters may include the camera's resolution, zoom power, permitted capture frequency, and/or other camera parameters. In such an embodiment, a requested sensor action may include, for example, to set one or more of those camera parameters to a maximum level to permit only low-quality images to be captured.

It should be appreciated that security module 202 may establish the trusted relationship between the local computing device 102 and the remote computing device 106 using any suitable techniques, algorithms, and/or mechanisms. For example, in the illustrative embodiment, the security module 202 exchanges cryptographic keys with the remote computing device 106 and determines which sensor actions the remote computing device 106 is authorized to request the local computing device 102 to perform. In particular, the security module 202 may generate an asymmetric key pair (i.e., a public-private cryptographic key pair including a private cryptographic key and a corresponding public cryptographic key) and transmit the public cryptographic key to the remote computing device 106 (e.g., via the communication module 206). Similarly, the remote computing device 106 may generate its own asymmetric key pair for the trusted relationship between the devices 102, 106. Further, the security module 202 may receive a public cryptographic key of the remote computing device 106 from the remote computing device 106. In the illustrative embodiment, the security module 202 stores the private cryptographic key of the local computing device 102 (i.e., the local private cryptographic key) and the public cryptographic key received from the remote computing device 106 (i.e., the remote public cryptographic key) as relationship data 208 in the memory 114 and/or the data storage 116. Although the cryptographic keys described herein are generally asymmetric cryptographic keys, it should be appreciated that symmetric cryptographic keys may be used in other embodiments. Further, in some embodiments, the local computing device 102 and/or the remote computing device 106 may utilize certificates (e.g., including cryptographic keys) to prove authenticity.

The relationship data 208 may include any information associated with the trusted relationship established between the local computing device 102 and the remote computing device 106. As such, the relationship data 208 may include the corresponding cryptographic keys discussed above, other relevant cryptographic keys (e.g., session keys), and/or other relevant information to the trusted relationship. In the illustrative embodiment, the relationship data 208 includes a control policy 210, which indicates which sensor actions can be controlled by various remote computing devices 106. For example, the security module 202 may determine (e.g., when establishing the trusted relationship) which sensor actions the remote computing device 106 is authorized to request the local computing device 102 to perform and update the control policy 210 accordingly. In other words, the security module 202 may determine which actions the local computing device 102 will perform associated with one or more sensors 120 of the local computing device 102 when requested to do so by the remote computing device 106. Additionally, in some embodiments, the security module 202 may determine various conditions associated with the particular sensor actions. For example, the security module 202 may determine a maximum length of time the remote computing device 106 is authorized to have the sensor management module 204 change the state of a particular sensor 120 (e.g., to disable to sensor 120) of the local computing device 102 before reverting the sensor 120 to its ordinary state (e.g., enabled). Such conditions may be related to the context of the local computing device 102 and/or its environment and may include, for example, the location of the local computing device 102, environmental parameters of the local computing device 102 (e.g., temperature, environment type, sound volume, etc.), user actions, temporal characteristics (e.g., a time limit), and/or other contexts of the local computing device 102. It should be appreciated that the local computing device 102 may consider such contextual information as it relates to a condition of a sensor action in the control policy 210 and/or separate from the control policy 210 depending on the particular embodiment.

It should be appreciated that, in some embodiments, the control policy 210 may include sensor action authorizations and corresponding parameter/condition data for each of the remote computing device 106 with which the local computing device 102 has established a trusted relationship. Additionally, in some embodiments, the control policy 210 may include a default policy for remote computing devices 106 with which the local computing device 102 has not established a relationship. For example, in some embodiments, the local computing device 102 may prohibit such remote computing devices 102 from requesting any sensor action, whereas in other embodiments, the local computing device 102 may authorize the remote computing device 106 to request one or more sensor actions. When the local computing device 102 receives a request from a remote computing device 106 to perform a particular sensor action, the security module 202 may verify the received request to confirm that the remote computing device 106 is authorized to make the request based on the relationship data 208 and control policy 210 as described below. In some embodiments, the control policy 210 may be managed by the user of the local computing device 102; however, in other embodiments, the control policy 210 may be inaccessible to the user.

The sensor management module 204 is configured to manage the sensors 120 of the local computing device 102. In the illustrative embodiment, the sensor management module 204 is embodied as, or otherwise incorporated in, the sensor controller 118. As described herein, the sensor management module 204 may receive a request from the remote computing device 106 (e.g., via the communication module 206) to perform a particular sensor action (e.g., disable a sensor 120 such as a microphone and/or camera). In some embodiments, the request may include various sensor action parameters, which may be indicative of one or more conditions associated with the performance of the sensor action. For example, the sensor management module 204 may receive a request to disable all audiovisual sensors 120 (e.g., microphones and cameras) of the local computing device 102 for a particular period of time. If the request is verified by the security module 202, the sensor management module 204 performs the sensor action (e.g., disables the corresponding sensors 120) and may monitor for the satisfaction of any conditions associated with the request (e.g., expiration of a timer). When the condition is satisfied, the sensor management module 204 performs a corresponding sensor action (e.g., a condition satisfaction action). For example, the sensor management module 204 may re-enable disabled sensors 120. In some embodiments, the sensor management module 204 transmits a response message to the remote computing device 106 based on the request. The response message may indicate, for example, whether the requested sensor action has been performed.

The communication module 206 handles the communication between the local computing device 102 and remote computing devices (e.g., the remote computing device 106) through the network 104. For example, as described herein, the communication module 206 may communicate with the remote computing device 106 to establish the trusted relationship between the local computing device 102 and the remote computing device 106 and to exchange data with the remote computing device 106 associated with a sensor action request.

Figure 3:
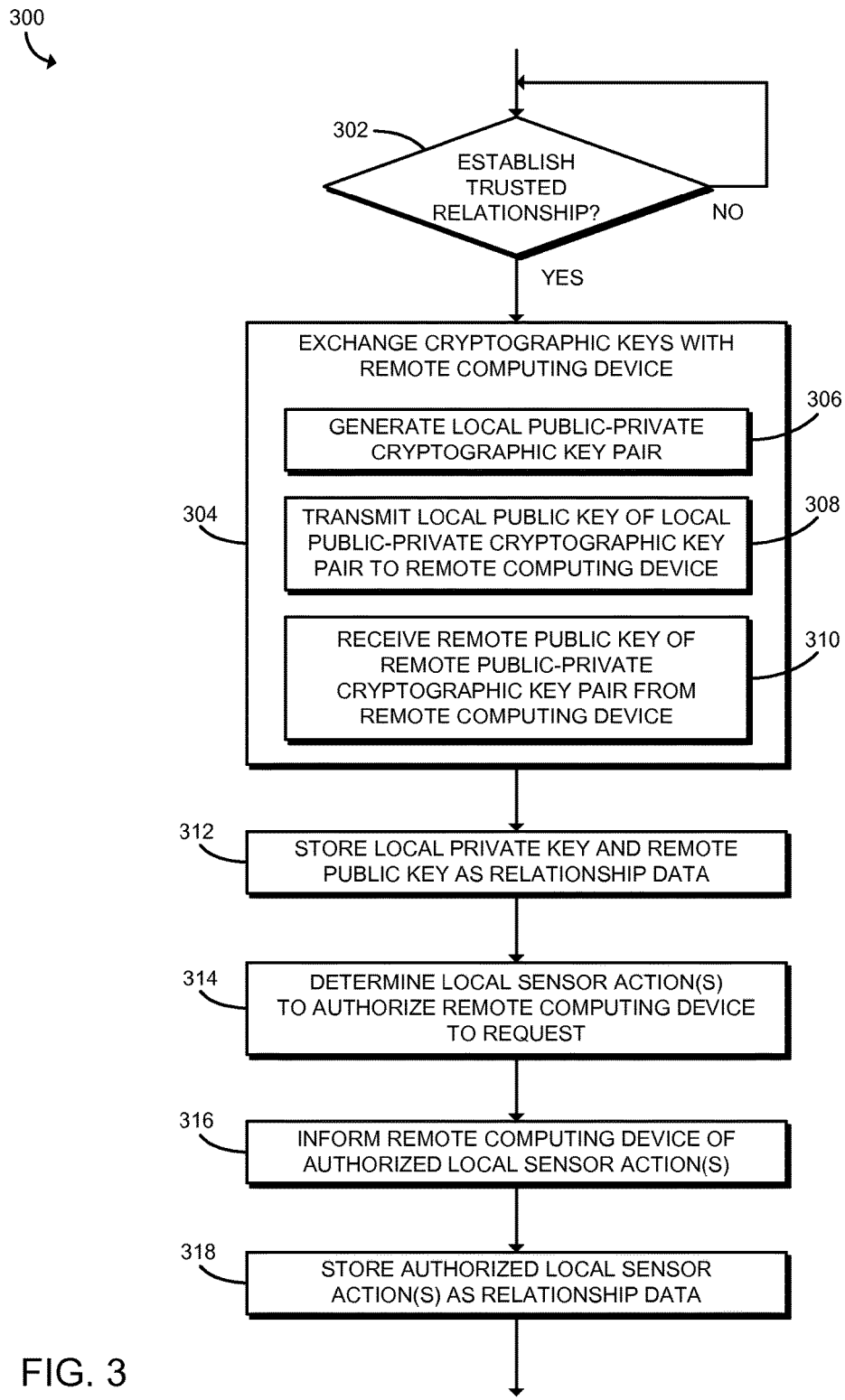
FIG. 3 is a simplified flow diagram of at least one embodiment of a method for establishing a trust relationship between the local computing device and the remote computing device of the system of FIG. 1.

Referring now to FIG. 3, in use, the local computing device 102 may execute a method 300 for establishing a trust relationship between the local computing device 102 and the remote computing device 106. The illustrative method 300 begins with block 302 of FIG. 3 in which the local computing device 102 determines whether to establish a trusted relationship with a particular remote computing device 106. In the illustrative embodiment, if a user of the remote computing device 106 wants the capability to request the local computing device 102 to perform a particular sensor action (e.g., disable sensors 120) and confirm that the sensor action has been performed, the remote computing device 106 establishes a trusted relationship with the local computing device 102 (e.g., to get permission from the local computing device 102 and/or the user of the local computing device 102).

If the local computing device 102 determines to establish a trusted relationship with the remote computing device 106, the local computing device 102 exchanges cryptographic keys with the remote computing device 106 in block 304. As indicated above, in the illustrative embodiment, asymmetric cryptographic keys are utilized; however, it should be appreciated that symmetric cryptographic keys may be utilized, additionally or alternatively, in other embodiments. In block 306, the local computing device 102 generates an asymmetric public-private cryptographic key pair (i.e., a local public-private cryptographic key pair). It should be appreciated that the local public-private cryptographic key pair includes a public cryptographic key and a corresponding private cryptographic key. Of course, in some embodiments, the local public-private cryptographic key pair may be previously generated or generated by a remote device (e.g., a certificate authority or key management server) and transmitted to the local computing device 102 for use. In block 308, the local computing device 102 transmits the local public cryptographic key to the remote computing device 106. As indicated above, in some embodiments, the local computing device 102 may also transmit a certificate to verify the authenticity of the local public cryptographic key and/or the local computing device 102. In block 310, the local computing device 102 receives a remote public cryptographic key from the remote computing device 106. That is, the remote computing device 106 generates (or receives for use) an asymmetric public-private cryptographic key pair (i.e., a remote public-private cryptographic key pair) including a remote public cryptographic key and a remote private cryptographic key for use with communications with the local computing device 102 and transmits the remote public cryptographic key to the local computing device 102.

In block 312, the local computing device 102 stores the local private cryptographic key and the remote public cryptographic key as relationship data 208 for the relationship between the local computing device 102 and the remote computing device 106 (e.g., in the data storage 116 of the local computing device 102). As described herein, the local computing device 102 may utilize those keys to securely communicate with the remote computing device 106. In some embodiments, the local computing device 102 may also store the public local cryptographic key.

In block 314, the local computing device 102 determines which sensor actions, if any, the remote computing device 106 is authorized to request the local computing device 102 to perform. In other words, the local computing device 102 determines which sensor actions it will perform when requested to do so by the remote computing device 106. It should be appreciated that the local computing device 102 may perform a particular sensor action for one remote computing device 106 and not for another remote computing device 106. The local computing device 102 may make such a determination based on any suitable technique or algorithm. In some embodiments, the local computing device 102 may also determine various conditions associated with a particular sensor action (e.g., a time limit for the sensor action). Further, in some embodiments, the remote computing device 106 can request the local computing device 102 to authorize it to request particular sensor actions. For example, in such embodiments, the remote computing device 106 might request the local computing device 102 to authorize it to request the local computing device 102 to disable all audiovisual sensors of the local computing device 102. In other embodiments, the local computing device 102 makes such a determination without a receiving a specific request from the remote computing device 106.

In block 316, the local computing device 102 informs the remote computing device 106 of which sensor actions the local computing device 102 has authorized the remote computing device 106 to request the local computing device 102 to perform. Further, in block 318, the local computing device 102 stores the authorized sensor actions in the control policy 210 corresponding with the remote computing device 106. As discussed below, in the illustrative embodiment, the local computing device 102 may compare a subsequent request to perform a sensor action received from the remote computing device 106 to the control policy 210 to determine whether the remote computing device 106 is authorized to make such a request. It should be appreciated that the functions described as occurring on the local computing device 102 and the remote computing device 106 may be reversed in some embodiments. For example, the local computing device 102 may request one or more remote computing devices 106 to perform a particular sensor action.

Figure 4:
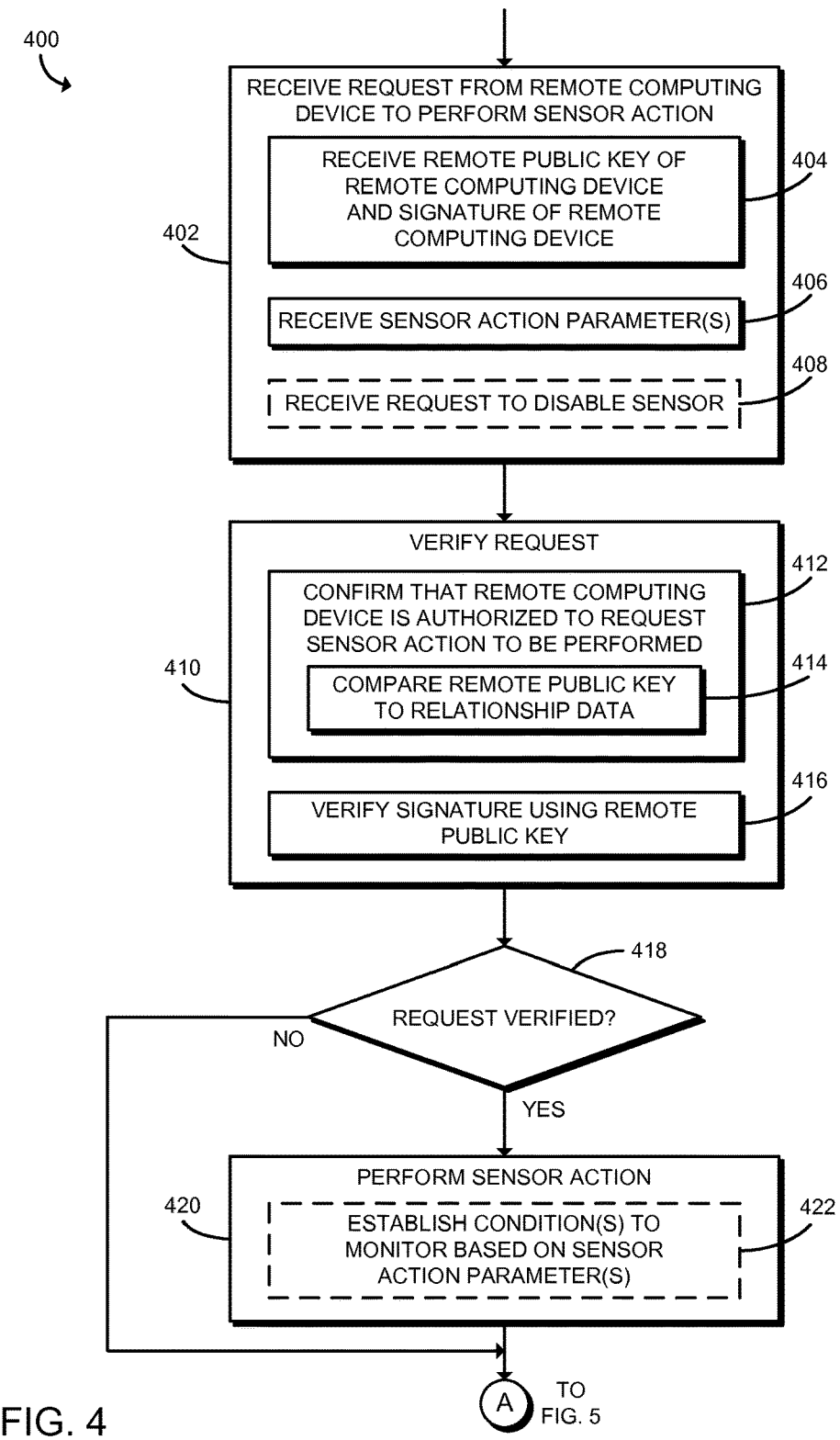
FIGS. 4-5 is a simplified flow diagram of at least one embodiment of a method for sensor action verification by the local computing device of the system of FIG. 1.
Figure 5:
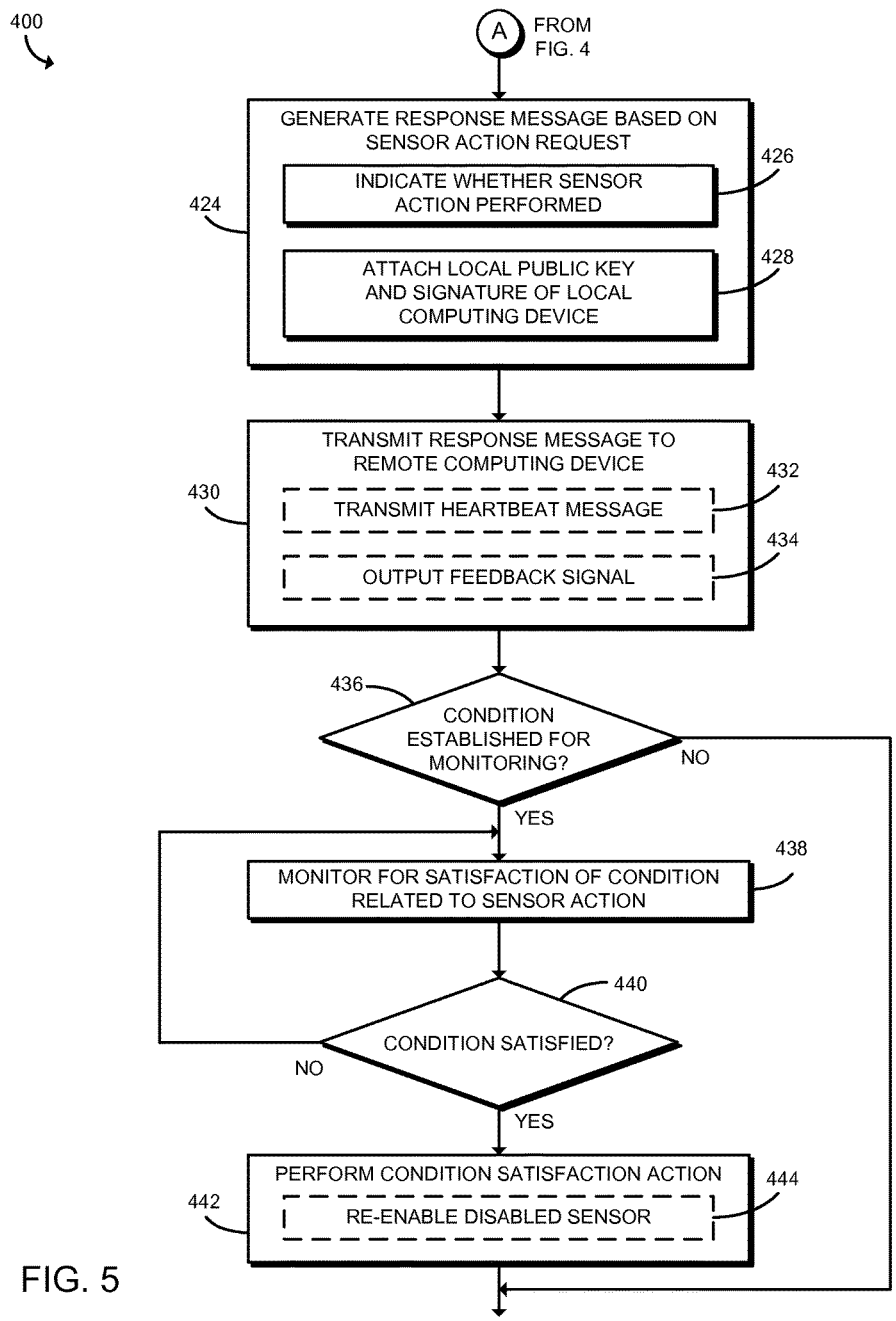

Referring now to FIGS. 4-5, in use, the local computing device 102 may execute a method 400 for sensor action verification. The illustrative method 400 begins with block 402 of FIG. 4 in which the local computing device 102 receives a request from the remote computing device 106 to perform a particular sensor action. In doing so, the local computing device 102 may receive a remote public cryptographic key and a signature of the remote computing device 106 from the requesting remote computing device 106. Further, in block 406, the local computing device 102 may receive one or more sensor action parameters. The sensor action parameters may include data indicative of a condition associated with the performance of the sensor action (e.g., a time limit). It should be appreciated that the particular sensor action requested may vary depending on the particular embodiment and the purpose of the request. For example, in block 408, the local computing device 102 may receive a request from the remote computing device 106 to disable a sensor 120 of the local computing device 102. As discussed herein, the sensor action may be embodied as any action associated with one or more of the sensors 120 of the local computing device 102. In some embodiments, the sensor action is associated with modifying the functionality of a sensor 120. Additionally, in some embodiments, the local computing device 102 may also receive a nonce, certificate, hash, timestamp, and/or other data to increase the security of the communication (e.g., to protect against replay attacks). In an embodiment, a request from the remote computing device 106 may include the remote public cryptographic key, the sensor action requested (e.g., disable the microphone), a time limit (e.g., the duration that the sensor action should be valid before reverting back to the previous state), a nonce (e.g., a random value), and a cryptographic signature of the remote computing device 106. It should be appreciated that the cryptographic signature may be signed with the remote private cryptographic key corresponding with the remote public cryptographic key.

In the illustrative embodiment, upon receiving the request, the local computing device 102 may forward the request to the sensor controller 118, which controls operation of the sensors 120 of the local computing device 102. In block 410, the local computing device 102 (e.g., via the sensor controller 118) verifies the sensor action request received from the remote computing device 106. In doing so, the local computing device 102 confirms that the remote computing device 106 is authorized to request the sensor action to be performed in block 412. In particular, in block 414, the local computing device 102 may compare the remote public cryptographic key to the relationship data 208. That is, the local computing device 102 may search the relationship data 208 (e.g., a database) to find a match for the remote public cryptographic key. As described above, in some embodiments, the local computing device 102 stores the remote public cryptographic key received from the remote computing device 106 when establishing the trusted relationship and also stores sensor actions (in the control policy 210) that remote computing device 106 is authorized to request, sensor action parameters, and/or other related information. As such, the local computing device 102 can determine the sensor actions the requesting remote computing device 106 is authorized to request of the local computing device 102 based on the received remote public cryptographic key. It should be appreciated that, in some embodiments, the local computing device 102 may utilize one or more device identifiers, which may also be exchanged during the establishment of the trusted relationship, to identify the remote computing device 106. For example, the local computing device 102 and the remote computing device 106 may exchange and/or use internet protocol (IP) addresses, mobile identification numbers (MINs), International Mobile Station Equipment Identities (IMEIs), and/or other unique identifiers of the computing devices 102, 106.

In block 416, the local computing device 102 verifies the signature received from the remote computing device 106 using the received remote public cryptographic key. It should be appreciated that, if the cryptographic key (e.g., the remote private cryptographic key) used to sign the message corresponds with the remote public cryptographic key (i.e., it is a valid public-private cryptographic key pair), the signature will be verified. As discussed above, in the illustrative embodiment, the verification of the request may be performed by the security engine 122 of the local computing device 102. Further, in some embodiments, the security engine 122 may form a portion of the sensor controller 118.

In block 418, the local computing device 102 determines whether the request has been verified. If so, the local computing device 102 performs the requested sensor action in block 420. In doing so, in block 422, the local computing device 102 may establish one or more conditions to monitor based on the sensor action parameters in some embodiments. For example, in an embodiment, the local computing device 102 may receive a request from the remote computing device 106 to disable the audiovisual sensors of the local computing device 102 for thirty minutes starting at a particular time (e.g., the duration of a confidential meeting). In such embodiments, the local computing device 102 may establish a timer for thirty minutes, after which the local computing device 102 is to re-enable the audiovisual sensors. Of course, the local computing device 102 could perform another equivalent action such as determine the time thirty minutes from the determined start time and monitor to determine when that time has been reached. It should be appreciated that, in some embodiments, the requested sensor action and/or parameters may require the local computing device 102 to perform several discrete sensors actions over a long period of time. For example, the local computing device 102 may determine to disable the audiovisual sensors every time the local computing device 102 is within a particular proximity of the remote computing device 106 (e.g., a stationary beacon device, desktop computer, and/or other computing device). In such a way, an employer could place a device in a private conference room with which all employee devices are required to establish trusted relationships so that sensors of the employee devices are automatically disabled upon entering the conference room.

Regardless of whether the request was verified, the method 400 advances to block 424 of FIG. 5 in which the local computing device 102 generates a response message based on the sensor action request. In particular, in block 426, the local computing device 102 indicates whether the sensor action was performed. For example, the local computing device 102 may inform the remote computing device 106 that certain sensors have been disabled or have otherwise had their functionality altered in the requested manner. Further, in some embodiments, the local computing device 102 may not fully perform the requested sensor action but may do so partially. For example, upon receiving a request to disable all sensors 120, the local computing device 102 may disable all sensors 120 unrelated to security functions. In such embodiments, the local computing device 102 may inform the remote computing device 106 of the sensor actions that were taken, those that were not taken, or in another suitable manner. In some embodiments, the remote computing device 106 may subsequently determine whether such partial actions are satisfactory and/or otherwise communication additional requests to the local computing device 102 to arrive at an agreed upon sensor control scheme. It should be appreciated that the local computing device 102 may not perform any sensor actions in certain circumstances. For example, in the illustrative embodiment, the local computing device 102 does not perform sensor actions on behalf of a particular remote computing device 106 if there is no previously established trusted relationship between the local computing device 102 and that remote computing device 106. Of course, the local computing device 102 may determine not to perform a particular requested sensor action for different reasons in other embodiments.

In block 428, the local computing device 102 attaches the local public cryptographic key and the signature of the local computing device 102 to the response message. In the illustrative embodiment, the signature is generated based on the local private cryptographic key corresponding with the local public cryptographic key such that those two keys form a valid public-private cryptographic key pair. In other embodiments, the local computing device 102 may use other cryptographic keys to sign the message and may also include other security features in the response message (e.g., a certificate, nonce, timestamp, hash, etc.). Further, in some embodiments, each of the messages may be further encrypted (e.g., with a session key) for additional security.

In block 430, the local computing device 102 transmits the response message to the remote computing device 106. In some embodiments, the sensor controller 118 forwards the generated response message to the processor 110 and/or the communication circuitry 126, which in turn transmits the response message to the remote computing device 106. It should be appreciated that the remote computing device 106 may verify the response message based on the local public cryptographic key and the signature in a manner similar to that described above (see block 410 of FIG. 4). By doing so, the remote computing device 106 may ensure that the local computing device 102 actually transmitted the response message and that there was, for example, not a replay attack attempting to convince the remote computing device 106 that the local computing device 102 performed a sensor action that it had not.

In some embodiments, in block 432, the local computing device 102 may transmit a heartbeat message to periodically confirm the status of the sensor(s) 120 associated with the requested sensor action. To do so, the local computing device 102 may generate a message similar to the response message described above. Further, in block 434, the local computing device 102 may output a feedback signal or message to the remote computing device 106 to indicate that the local computing device 102 is in the process of performing the sensor action, that the sensor action is still valid (e.g., the sensor 120 is still disabled), and/or provide other relevant information. For example, the local computing device 102 may blink a light-emitting diode (LED), render a message on a display, emit an audible sound, or otherwise alert the user of the remote computing device 106 and/or the local computing device 102 of various statuses related to the sensor action request. Further, in some embodiments, the sensor controller 118 and/or the security engine 122 maintains contextual information regarding the progress of sensor actions requested by one or more remote computing devices 106 such that the local computing device 102 can load that information upon boot and modify the functionality of the sensor(s) 120 accordingly. Of course, the local computing device 102 may utilize other algorithms, techniques, and/or mechanisms to ensure, for example, that the local computing device 102 has not been restarted or otherwise modified in an attempt to circumvent the authorized sensor action.

In block 436, the local computing device 102 determines whether a condition associated with the requested sensor action has been established that requires to be monitored. For example, as indicated above, the local computing device 102 may disable a particular sensor 120 for a predetermined period of time. In such embodiments, the local computing device 102 may monitor to determine when that period of time has elapsed. If a condition requires monitoring, in block 438, the local computing device 102 monitors for satisfaction of the relevant condition and, in block 440, the local computing device 102 determines whether the condition has been satisfied. In other words, the local computing device 102 continues to monitor for the satisfaction of that condition until the condition has been satisfied. If so, in block 442, the local computing device 102 performs a corresponding action associated with the satisfaction of the condition (i.e., a condition satisfaction action). For example, in block 444, the local computing device 102 may re-enable a disabled sensor 120.

Although the sensor conditions are described herein primarily with respect to temporal conditions (e.g., time limits), it should be appreciated that other non-temporal sensor conditions may be utilized in other embodiments. For example, the local computing device 102 may receive a request to disable a sensor 120 when the local computing device 102 is at a particular geographical location (e.g., a defense industry installation). As such, it should be appreciated that the local computing device 102 may disable one sensor 120 (e.g., an audiovisual sensor) in response to the sensor action request and utilize another sensor 120 (e.g., a location sensor) to determine whether a condition associated with the sensor action (e.g., indicated by the received sensor action parameters) has been met.

Figure 6:
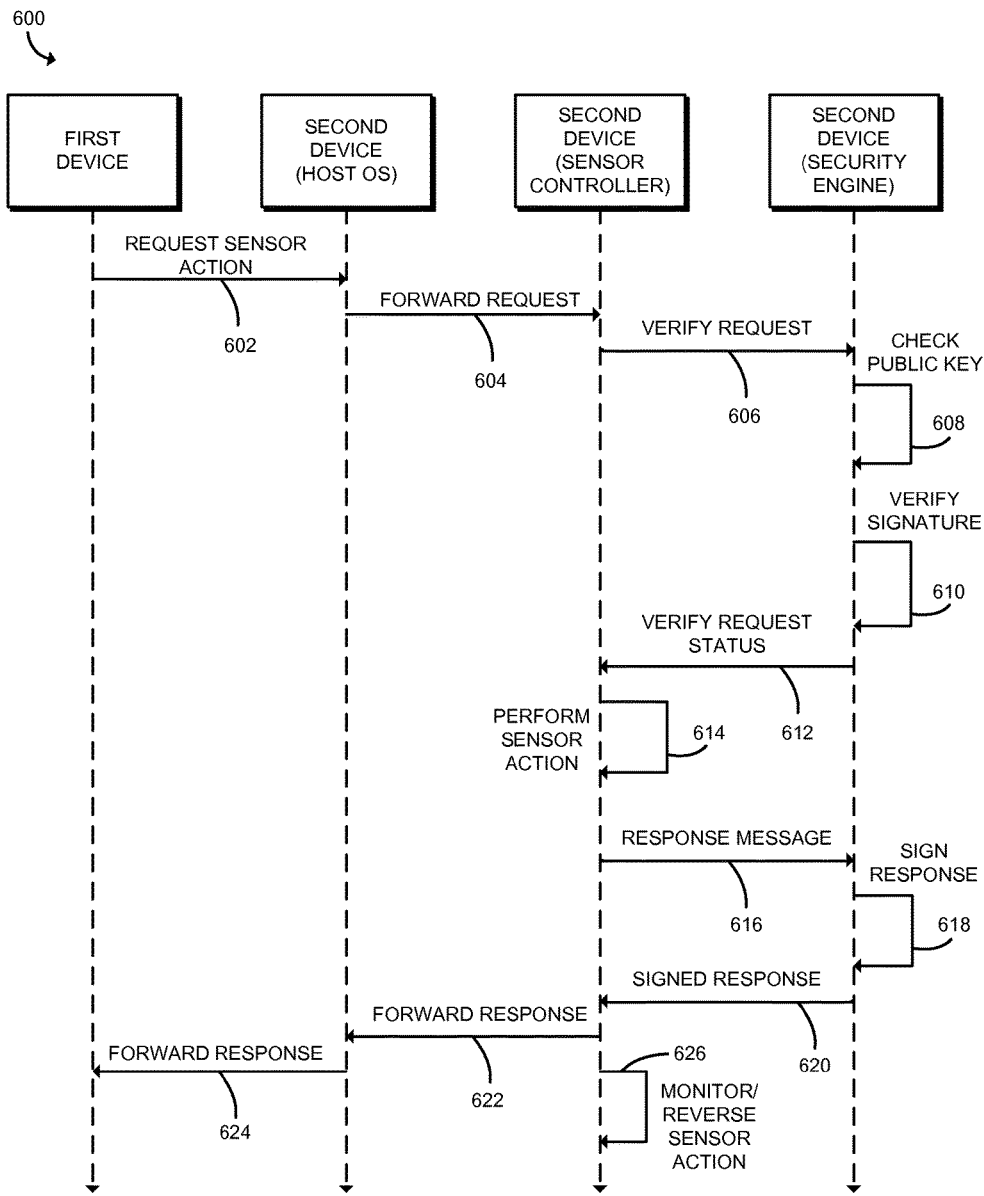
FIG. 6 is a simplified flow diagram of at least one other embodiment of a method for sensor action verification.

Referring now to FIG. 6, a method 600 for sensor action verification is shown in which a first device (e.g., the remote computing device 106) is requesting a second device (e.g., the local computing device 102) to perform a particular sensor action. The illustrative method 600 begins with process 602 of FIG. 6 in which the first device requests the second device to perform a particular sensor action. In process 604, the second device forwards the sensor action request from the host operating system (e.g., the processor 110) to the sensor controller 118 of the second device. In process 606, the second device transmits a request to the security engine 122 of the second device to verify the sensor action request. As discussed above, in some embodiments, the security engine 122 may form a portion of the sensor controller 118. In process 608, the security engine 122 of the second device confirms that the public key received with the sensor action request corresponds with a public key stored in a relationship data 208 such that the first device is a valid sensor action requestor. In process 610, the security engine 122 verifies that the signature is valid based on the received public key. In process 612, the security engine 122 transmits a status message regarding the verification request to the sensor controller 118 of the second device indicating whether the verification was successful. If so, in process 614, the sensor controller 118 performs the requested sensor action and, in process 616, the sensor controller 118 generates a response message indicating that the sensor action has been taken and forwards it to the security engine 122. In process 618, the security engine 122 cryptographically signs the response message. In process 620, the security engine 122 forwards the signed response message to the sensor controller 118, which in turn forwards the signed response message to the host operating system (e.g., the processor 110) of the second device in process 622. In process 624, the host operating system of the second device forwards the signed response message to the first device. In process 626, the second device monitors any conditions associated with the sensor action (e.g., a time limit) and reverses the sensor action when the condition is satisfied.

Examples

Illustrative examples of the technologies disclosed herein are provided below. An embodiment of the technologies may include any one or more, and any combination of, the examples described below.

Example 1 includes local computing device for sensor action verification, the local computing device comprising one or more sensors to generate sensor data; a sensor management module to receive a request for the local computing device to perform a sensor action from a remote computing device; and a security module to verify the received request to confirm that the remote computing device is authorized to request the local computing device to perform the sensor action; wherein the sensor management module is further to (i) perform the requested sensor action in response to verification of the received request by the security module and (ii) transmit a response message to the remote computing device that indicates whether the requested sensor action has been performed by the local computing device.

Example 2 includes the subject matter of Example 1, and wherein to receive the request for the local computing device to perform the sensor action comprises to receive a request to disable a sensor of the local computing device.

Example 3 includes the subject matter of any of Examples 1 and 2, and wherein to receive the request to disable the sensor of the local computing device comprises to receive a request to disable at least one of a camera or a microphone of the local computing device.

Example 4 includes the subject matter of any of Examples 1-3, and wherein to receive the request for the local computing device to perform the sensor action comprises to receive a request to disable a sensor of the local computing device for a determined period of time; wherein to perform the requested sensor action comprises to disable the sensor and establish a timer that corresponds with the determined period of time; and wherein the sensor management module is further to re-enable the disabled sensor in response to expiration of the timer.

Example 5 includes the subject matter of any of Examples 1-4, and wherein to receive the request for the local computing device to perform the sensor action comprises to receive one or more sensor action parameters indicative of a condition associated with the performance of the sensor action.

Example 6 includes the subject matter of any of Examples 1-5, and wherein the sensor management module is further to monitor for a satisfaction of the condition associated with the performance of the sensor action.

Example 7 includes the subject matter of any of Examples 1-6, and wherein the sensor management module is further to perform a condition satisfaction action that corresponds with the satisfaction of the condition in response to a determination that the condition has been satisfied.

Example 8 includes the subject matter of any of Examples 1-7, and wherein to receive the request to perform the sensor action comprises to receive a remote public cryptographic key of the remote computing device and a signature of the remote computing device; and wherein to verify the received request comprises to (i) confirm that the remote computing device is authorized to request the sensor action to be performed by the local computing device and (ii) verify the signature with the remote public cryptographic key.

Example 9 includes the subject matter of any of Examples 1-8, and wherein to confirm that the remote computing device is authorized to request the sensor action to be performed by the local computing device comprises to compare the remote public cryptographic key to relationship data stored on the local computing device, wherein the relationship data includes a control policy that identifies sensor actions the remote computing device is authorized to request the local computing device to perform.

Example 10 includes the subject matter of any of Examples 1-9, and wherein the sensor management module is further to generate the response message based on the requested sensor action, wherein the generated response message (i) indicates whether the requested sensor action has been performed by the sensor management module of the local computing device and (ii) includes a local public cryptographic key of the local computing device and a signature of the local computing device for use by the remote computing device to verify the local computing device.

Example 11 includes the subject matter of any of Examples 1-10, and wherein the security module is further to establish a trusted relationship with the remote computing device, wherein to verify the received request comprises to verify the received request to confirm that the remote computing device is authorized to request the local computing device to perform the sensor action based on the established trusted relationship.

Example 12 includes the subject matter of any of Examples 1-11, and wherein to establish the trusted relationship with the remote computing device comprises to exchange cryptographic keys with the remote computing device.

Example 13 includes the subject matter of any of Examples 1-12, and wherein to establish the trusted relationship with the remote computing device comprises to transmit a local public cryptographic key of the local computing device to the remote computing device; receive a remote public cryptographic key of the remote computing device from the remote computing device; and store (i) a local private cryptographic key that corresponds with the local public cryptographic key and (ii) the remote public cryptographic key as relationship data for the remote computing device on a memory of the local computing device.

Example 14 includes the subject matter of any of Examples 1-13, and wherein to establish the trusted relationship comprises to determine a sensor action of the local computing device that the remote computing device is authorized to request the local computing device to perform.

Example 15 includes the subject matter of any of Examples 1-14, and wherein to establish the trusted relationship comprises inform the remote computing device that the remote computing device is authorized to request the local computing device to perform the determined sensor action.

Example 16 includes the subject matter of any of Examples 1-15, and wherein to establish the trusted relationship comprises to store the determined sensor action in a control policy associated with the remote computing device.

Example 17 includes the subject matter of any of Examples 1-16, and wherein the sensor management module is further to output a feedback signal indicating a status of the request to perform the sensor action.

Example 18 includes the subject matter of any of Examples 1-17, and wherein the sensor management module is further to transmit a heartbeat signal to the remote computing device that indicates a status of the sensor corresponding with the requested sensor action.

Example 19 includes the subject matter of any of Examples 1-18, and wherein to receive the request for the local computing device to perform the sensor action comprises to receive a request to modify a control parameter of a sensor of the local computing device, wherein the sensor includes a plurality of control parameters.

Example 20 includes the subject matter of any of Examples 1-19, and further including a sensor controller that includes the sensor management module.

Example 21 includes the subject matter of any of Examples 1-20, and wherein the sensor controller comprises an integrated sensor hub.

Example 22 includes the subject matter of any of Examples 1-21, and further including a main processor, wherein the sensor controller is embodied as a co-processor different from the main processor.

Example 23 includes a method for sensor action verification, the method comprising receiving, by a local computing device and from a remote computing device, a request for the local computing device to perform a sensor action; verifying, by the local computing device, the received request to confirm that the remote computing device is authorized to request the local computing device to perform the sensor action; performing, by a sensor controller of the local computing device, the requested sensor action in response to verification of the received request, wherein the sensor controller manages operation of one or more sensors of the local computing device; and transmitting, by the local computing device, a response message to the remote computing device indicating whether the requested sensor action has been performed by the sensor controller of the local computing device.

Example 24 includes the subject matter of Example 23, and wherein receiving the request for the local computing device to perform the sensor action comprises receiving a request to disable a sensor of the local computing device.

Example 25 includes the subject matter of any of Examples 23 and 24, and wherein receiving the request to disable the sensor of the local computing device comprises receiving a request to disable at least one of a camera or a microphone of the local computing device.

Example 26 includes the subject matter of any of Examples 23-25, and wherein receiving the request for the local computing device to perform the sensor action comprises receiving a request to disable a sensor of the local computing device for a determined period of time; wherein performing the requested sensor action comprises disabling the sensor and establishing a timer corresponding with the determined period of time; and further comprising re-enabling the disabled sensor in response to expiration of the timer.

Example 27 includes the subject matter of any of Examples 23-26, and wherein receiving the request for the local computing device to perform the sensor action comprises receiving one or more sensor action parameters indicative of a condition associated with the performance of the sensor action.

Example 28 includes the subject matter of any of Examples 23-27, and further including monitoring, by the local computing device, for a satisfaction of the condition associated with the performance of the sensor action.

Example 29 includes the subject matter of any of Examples 23-28, and further including performing, by the local computing device, a condition satisfaction action corresponding with the satisfaction of the condition in response to determining the condition has been satisfied.

Example 30 includes the subject matter of any of Examples 23-29, and wherein receiving the request to perform the sensor action comprises receiving a remote public cryptographic key of the remote computing device and a signature of the remote computing device; and wherein verifying the received request comprises (i) confirming that the remote computing device is authorized to request the sensor action to be performed by the local computing device and (ii) verifying the signature using the remote public cryptographic key.

Example 31 includes the subject matter of any of Examples 23-30, and wherein confirming that the remote computing device is authorized to request the sensor action to be performed by the local computing device comprises comparing the remote public cryptographic key to relationship data stored on the local computing device, wherein the relationship data includes a control policy that identifies sensor actions the remote computing device is authorized to request the local computing device to perform.

Example 32 includes the subject matter of any of Examples 23-31, and further including generating the response message based on the requested sensor action, the generated response message (i) indicating whether the requested sensor action has been performed by the sensor controller of the local computing device and (ii) including a local public cryptographic key of the local computing device and a signature of the local computing device for use by the remote computing device in verifying the local computing device.

Example 33 includes the subject matter of any of Examples 23-32, and further including establishing, by the local computing device, a trusted relationship with the remote computing device, wherein verifying the received request comprises verifying the received request to confirm that the remote computing device is authorized to request the local computing device to perform the sensor action based on the established trusted relationship.

Example 34 includes the subject matter of any of Examples 23-33, and wherein establishing the trusted relationship with the remote computing device comprises exchanging cryptographic keys with the remote computing device.

Example 35 includes the subject matter of any of Examples 23-34, and establishing the trusted relationship with the remote computing device comprises transmitting, by the local computing device, a local public cryptographic key of the local computing device to the remote computing device; receiving, by the local computing device, a remote public cryptographic key of the remote computing device from the remote computing device; and storing, by the local computing device, (i) a local private cryptographic key corresponding with the local public cryptographic key and (ii) the remote public cryptographic key as relationship data for the remote computing device on a memory of the local computing device.

Example 36 includes the subject matter of any of Examples 23-35, and wherein establishing the trusted relationship comprises determining a sensor action of the local computing device that the remote computing device is authorized to request the local computing device to perform.

Example 37 includes the subject matter of any of Examples 23-36, and wherein establishing the trusted relationship comprises informing the remote computing device that the remote computing device is authorized to request the local computing device to perform the determined sensor action.

Example 38 includes the subject matter of any of Examples 23-37, and wherein establishing the trusted relationship comprises storing the determined sensor action in a control policy associated with the remote computing device.

Example 39 includes the subject matter of any of Examples 23-38, and further including outputting, by the local computing device, a feedback signal indicating a status of the request to perform the sensor action.

Example 40 includes the subject matter of any of Examples 23-39, and further including transmitting, by the local computing device, a heartbeat signal to the remote computing device indicating a status of the sensor corresponding with the requested sensor action.

Example 41 includes the subject matter of any of Examples 23-40, and wherein receiving the request for the local computing device to perform the sensor action comprises receiving a request to modify a control parameter of a sensor of the local computing device, wherein the sensor includes a plurality of control parameters.

Example 42 includes a computing device comprising a processor; and a memory having stored therein a plurality of instructions that when executed by the processor cause the computing device to perform the method of any of Examples 23-41.

Example 43 includes one or more machine-readable storage media comprising a plurality of instructions stored thereon that, in response to execution by a computing device, cause the computing device to perform the method of any of Examples 23-41.

Example 44 includes a local computing device for sensor action verification, the local computing device comprising means for receiving, from a remote computing device, a request for the local computing device to perform a sensor action; means for verifying the received request to confirm that the remote computing device is authorized to request the local computing device to perform the sensor action; means for performing, by a sensor controller of the local computing device, the requested sensor action in response to verification of the received request, wherein the sensor controller manages operation of one or more sensors of the local computing device; and means for transmitting a response message to the remote computing device indicating whether the requested sensor action has been performed by the sensor controller of the local computing device.

Example 45 includes the subject matter of Example 44, and wherein the means for receiving the request for the local computing device to perform the sensor action comprises means for receiving a request to disable a sensor of the local computing device.

Example 46 includes the subject matter of any of Examples 44 and 45, and wherein receiving the request to disable the sensor of the local computing device comprises receiving a request to disable at least one of a camera or a microphone of the local computing device.

Example 47 includes the subject matter of any of Examples 44-46, and wherein the means for receiving the request for the local computing device to perform the sensor action comprises means for receiving a request to disable a sensor of the local computing device for a determined period of time; wherein the means for performing the requested sensor action comprises (i) means for disabling the sensor and (ii) means for establishing a timer corresponding with the determined period of time; and further comprising means for re-enabling the disabled sensor in response to expiration of the timer.

Example 48 includes the subject matter of any of Examples 44-47, and wherein the means for receiving the request for the local computing device to perform the sensor action comprises means for receiving one or more sensor action parameters indicative of a condition associated with the performance of the sensor action.

Example 49 includes the subject matter of any of Examples 44-48, and further including means for monitoring for a satisfaction of the condition associated with the performance of the sensor action.

Example 50 includes the subject matter of any of Examples 44-49, and further including means for performing a condition satisfaction action corresponding with the satisfaction of the condition in response to determining the condition has been satisfied.

Example 51 includes the subject matter of any of Examples 44-50, and wherein the means for receiving the request to perform the sensor action comprises means for receiving a remote public cryptographic key of the remote computing device and a signature of the remote computing device; and wherein the means for verifying the received request comprises (i) means for confirming that the remote computing device is authorized to request the sensor action to be performed by the local computing device and (ii) means for verifying the signature using the remote public cryptographic key.

Example 52 includes the subject matter of any of Examples 44-51, and wherein the means for confirming that the remote computing device is authorized to request the sensor action to be performed by the local computing device comprises means for comparing the remote public cryptographic key to relationship data stored on the local computing device, wherein the relationship data includes a control policy that identifies sensor actions the remote computing device is authorized to request the local computing device to perform.

Example 53 includes the subject matter of any of Examples 44-52, and further including means for generating the response message based on the requested sensor action, wherein the generated response message (i) indicates whether the requested sensor action has been performed by the sensor controller of the local computing device and (ii) includes a local public cryptographic key of the local computing device and a signature of the local computing device for use by the remote computing device to verify the local computing device.

Example 54 includes the subject matter of any of Examples 44-53, and further including means for establishing a trusted relationship with the remote computing device, wherein the means for verifying the received request comprises means for verifying the received request to confirm that the remote computing device is authorized to request the local computing device to perform the sensor action based on the established trusted relationship.

Example 55 includes the subject matter of any of Examples 44-54, and wherein the means for establishing the trusted relationship with the remote computing device comprises means for exchanging cryptographic keys with the remote computing device.

Example 56 includes the subject matter of any of Examples 44-55, and wherein the means for establishing the trusted relationship with the remote computing device comprises means for transmitting a local public cryptographic key of the local computing device to the remote computing device; means for receiving a remote public cryptographic key of the remote computing device from the remote computing device; and means for storing (i) a local private cryptographic key corresponding with the local public cryptographic key and (ii) the remote public cryptographic key as relationship data for the remote computing device on a memory of the local computing device.

Example 57 includes the subject matter of any of Examples 44-56, and wherein the means for establishing the trusted relationship comprises means for determining a sensor action of the local computing device that the remote computing device is authorized to request the local computing device to perform.

Example 58 includes the subject matter of any of Examples 44-57, and wherein the means for establishing the trusted relationship comprises means for informing the remote computing device that the remote computing device is authorized to request the local computing device to perform the determined sensor action.

Example 59 includes the subject matter of any of Examples 44-58, and wherein the means for establishing the trusted relationship comprises means for storing the determined sensor action in a control policy associated with the remote computing device.

Example 60 includes the subject matter of any of Examples 44-59, and further including means for outputting a feedback signal indicating a status of the request to perform the sensor action.

Example 61 includes the subject matter of any of Examples 44-60, and further including means for transmitting a heartbeat signal to the remote computing device indicating a status of the sensor corresponding with the requested sensor action.

Example 62 includes the subject matter of any of Examples 44-61, and wherein the means for receiving the request for the local computing device to perform the sensor action comprises means for receiving a request to modify a control parameter of a sensor of the local computing device, wherein the sensor includes a plurality of control parameters.

The invention claimed is:

1. A local computing device for sensor action verification, the local computing device comprising:
   a main processor to execute an application;
   one or more sensors to generate sensor data;
   a sensor controller coupled to the one or more sensors; and
   a security engine;
   wherein the main processor is to: (i) receive, over a network, a request for the local computing device to perform a sensor action from a remote computing device, wherein the remote computer is not co-located with the local computing device, and (ii) forward the request to the sensor controller;
   wherein the security engine is to verify the received request to confirm that the remote computing device is authorized to request the local computing device to perform the sensor action;
   wherein the sensor controller is to (i) perform the requested sensor action in response to verification of the received request by the security engine and (ii) generate a response message that indicates whether the requested sensor action has been performed by the local computing device;
   wherein the main processor is to transmit the response message to the remote computing device; and
   wherein to perform the requested sensor action comprises to block control of the one or more sensors from the main processor while maintaining control of the one or more sensors by the sensor controller.

2. The local computing device of claim 1, wherein to receive the request for the local computing device to perform the sensor action comprises to receive a request to disable a sensor of the local computing device.

3. The local computing device of claim 2, wherein to receive the request to disable the sensor of the local computing device comprises to receive a request to disable at least one of a camera or a microphone of the local computing device.

4. The local computing device of claim 1, wherein to receive the request for the local computing device to perform the sensor action comprises to receive a request to disable a sensor of the local computing device for a determined period of time;
   wherein to perform the requested sensor action comprises to disable the sensor and establish a timer that corresponds with the determined period of time; and
   wherein the sensor controller is further to re-enable the disabled sensor in response to expiration of the timer.

5. The local computing device of claim 1, wherein to receive the request for the local computing device to perform the sensor action comprises to receive one or more sensor action parameters indicative of a condition associated with the performance of the sensor action; and wherein the sensor controller is further to:
   monitor for a satisfaction of the condition associated with the performance of the sensor action; and
   perform a condition satisfaction action that corresponds with the satisfaction of the condition in response to a determination that the condition has been satisfied.

6. The local computing device of claim 1, wherein to receive the request to perform the sensor action comprises to receive a remote public cryptographic key of the remote computing device and a signature of the remote computing device; and
   wherein to verify the received request comprises to (i) confirm that the remote computing device is authorized to request the sensor action to be performed by the local computing device and (ii) verify the signature with the remote public cryptographic key.

7. The local computing device of claim 6, wherein to confirm that the remote computing device is authorized to request the sensor action to be performed by the local computing device comprises to compare the remote public cryptographic key to relationship data stored on the local computing device, wherein the relationship data includes a control policy that identifies sensor actions the remote computing device is authorized to request the local computing device to perform.

8. The local computing device of claim 1, wherein the sensor controller is further to generate the response message based on the requested sensor action, wherein the generated response message (i) indicates whether the requested sensor action has been performed by the sensor controller of the local computing device and (ii) includes a local public cryptographic key of the local computing device and a signature of the local computing device generated by the security engine for use by the remote computing device to verify the local computing device.

9. The local computing device of claim 1, wherein the security engine is further to establish a trusted relationship with the remote computing device,
   wherein to verify the received request comprises to verify the received request to confirm that the remote computing device is authorized to request the local computing device to perform the sensor action based on the established trusted relationship.

10. The local computing device of claim 9, wherein to establish the trusted relationship with the remote computing device comprises to:
    transmit a local public cryptographic key of the local computing device to the remote computing device;
    receive a remote public cryptographic key of the remote computing device from the remote computing device;
    store (i) a local private cryptographic key that corresponds with the local public cryptographic key and (ii) the remote public cryptographic key as relationship data for the remote computing device on a memory of the local computing device;
    determine a sensor action of the local computing device that the remote computing device is authorized to request the local computing device to perform; and
    store the determined sensor action in a control policy associated with the remote computing device.

11. The local computing device of claim 1, wherein the sensor controller is further to output a feedback signal indicating a status of the request to perform the sensor action.

12. The local computing device of claim 1, wherein the sensor controller is further to transmit a heartbeat signal to the remote computing device via the main processor that indicates a status of the sensor corresponding with the requested sensor action.

13. The local computing device of claim 1, wherein the one or more sensors comprise a camera, wherein to receive the request for the local computing device to perform the sensor action comprises to receive a request to modify a control parameter of the camera, wherein the control parameter comprises at least one of a resolution of the camera, a zoom power of the camera, and a capture frequency of the camera.

14. The local computing device of claim 1, further comprising an integrated sensor hub that includes the sensor controller.

15. One or more non-transitory machine-readable storage media comprising a plurality of instructions stored thereon that, in response to execution by a local computing device, cause the local computing device to:
- execute, by a main processor of the local computing device, an application;
- receive, by the main processor from a remote computing device and over a network, a request for the local computing device to perform a sensor action, wherein the remote computing device is not co-located with the local computing device;
- forward, by the main processor, the request to a sensor controller of the local computing device;
- verify, by a security engine of the local computing device, the received request to confirm that the remote computing device is authorized to request the local computing device to perform the sensor action;
- perform, by the sensor controller, the requested sensor action in response to verification of the received request, wherein the sensor controller manages operation of one or more sensors of the local computing device;
- generate, by the sensor controller, a response message indicating whether the requested sensor action has been performed by the sensor controller of the local computing device; and
- transmit, by the main processor, the response message to the remote computing device;
- wherein to perform the requested sensor action comprises to block control of the one or more sensors from the main processor of the local computing device while maintaining control of the one or more sensors by the sensor controller.

16. The one or more non-transitory machine-readable storage media of claim 15, wherein to receive the request for the local computing device to perform the sensor action comprises to receive a request to disable a sensor of the local computing device.

17. The one or more non-transitory machine-readable storage media of claim 15, wherein to receive the request for the local computing device to perform the sensor action comprises to receive a request to disable a sensor of the local computing device for a determined period of time;
- wherein to perform the requested sensor action comprises to disable the sensor and establish a timer corresponding with the determined period of time; and
- wherein the plurality of instructions further cause the local computing device to re-enable the disabled sensor in response to expiration of the timer.

18. The one or more non-transitory machine-readable storage media of claim 15, wherein to receive the request to perform the sensor action comprises to receive a remote public cryptographic key of the remote computing device and a signature of the remote computing device; and
- wherein to verify the received request comprises to (i) confirm that the remote computing device is authorized to request the sensor action to be performed by the local computing device based on a comparison of the remote public cryptographic key to relationship data stored on the local computing device and (ii) verify the signature using the remote public cryptographic key, wherein the relationship data includes a control policy that identifies sensor actions the remote computing device is authorized to request the local computing device to perform.

19. The one or more non-transitory machine-readable storage media of claim 15, wherein the plurality of instructions further cause the local computing device to generate the response message based on the requested sensor action, wherein the generated response message (i) indicates whether the requested sensor action has been performed by the sensor controller of the local computing device and (ii) includes a local public cryptographic key of the local computing device and a signature of the local computing device generated by the security engine for use by the remote computing device to verify the local computing device.

20. The one or more non-transitory machine-readable storage media of claim 15, wherein the plurality of instructions further cause the local computing device to establish a trusted relationship with the remote computing device,
- wherein to verify the received request comprises to verify the received request to confirm that the remote computing device is authorized to request the local computing device to perform the sensor action based on the established trusted relationship.

21. The one or more non-transitory machine-readable storage media of claim 20, wherein to establish the trusted relationship with the remote computing device comprises to:
- transmit a local public cryptographic key of the local computing device to the remote computing device;
- receive a remote public cryptographic key of the remote computing device from the remote computing device;
- store (i) a local private cryptographic key corresponding with the local public cryptographic key and (ii) the remote public cryptographic key as relationship data for the remote computing device on a memory of the local computing device;
- determine a sensor action of the local computing device that the remote computing device is authorized to request the local computing device to perform; and
- store the determined sensor action in a control policy associated with the remote computing device.

22. The one or more non-transitory machine-readable storage media of claim 15, wherein to receive the request for the local computing device to perform the sensor action comprises to receive a request to modify a control parameter of a camera of the local computing device, wherein the control parameter comprises at least one of a resolution of the camera, a zoom power of the camera, and a capture frequency of the camera.

23. A method for sensor action verification, the method comprising:
- executing, by a main processor of a local computing device, an application;
- receiving, by the main processor and from a remote computing device, a request for the local computing device to perform a sensor action;
- forwarding, by the main processor, the request to a sensor controller of the local computing device;
- verifying, by a security engine of the local computing device, the received request to confirm that the remote computing device is authorized to request the local computing device to perform the sensor action;
- performing, by a sensor controller of the local computing device, the requested sensor action in response to verification of the received request, wherein the sensor controller manages operation of one or more sensors of the local computing device;
- generating, by the sensor controller, a response message indicating whether the requested sensor action has been performed by the sensor controller of the local computing device; and transmitting, by the main processor, the response message to the remote computing device;

wherein performing the requested sensor action comprises blocking control of one or more sensors from a main processor of the local computing device while maintaining control of the one or more sensors by the sensor controller.

24. The method of claim 23, wherein receiving the request for the local computing device to perform the sensor action comprises receiving a request to disable a sensor of the local computing device for a determined period of time;

wherein performing the requested sensor action comprises disabling the sensor and establishing a timer corresponding with the determined period of time; and further comprising re-enabling the disabled sensor in response to expiration of the timer.

* * * * *